Figures 1, 2:
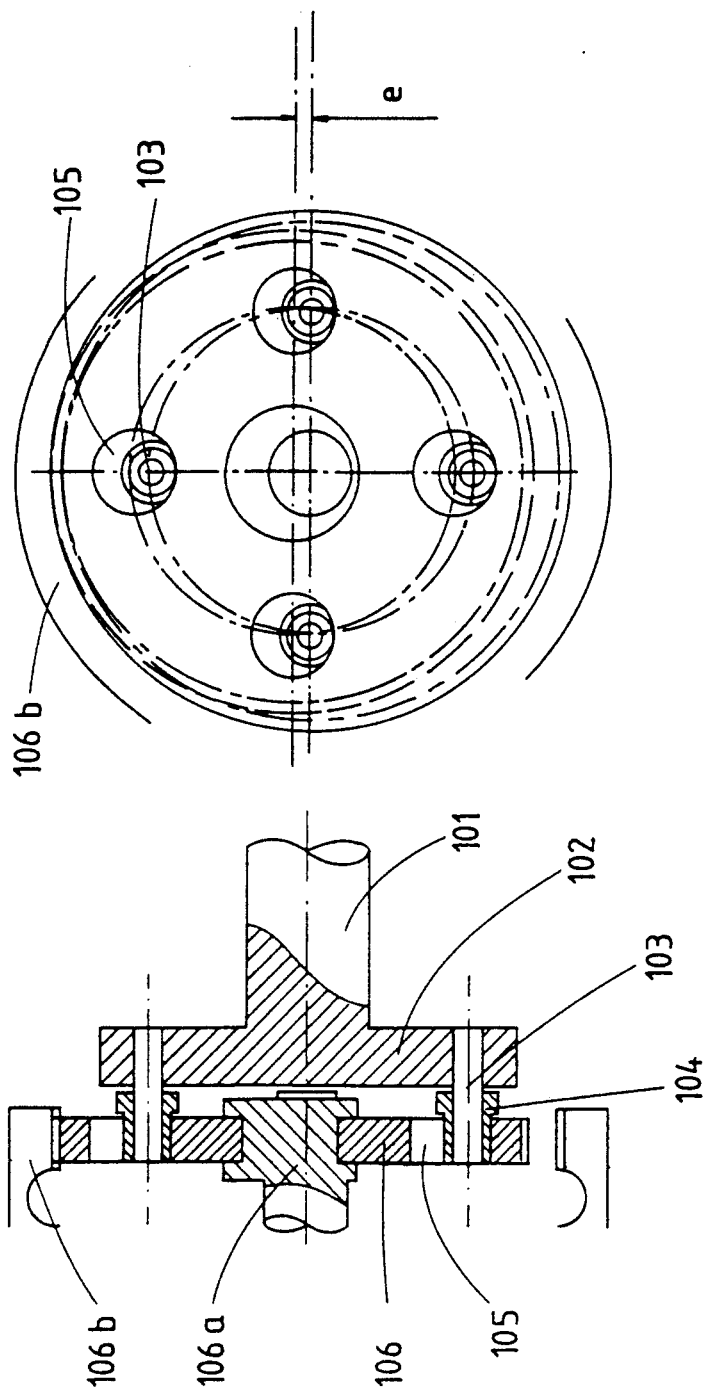

United States Patent [19]
Rennerfelt

[11] Patent Number: 4,994,005
[45] Date of Patent: Feb. 19, 1991

[54] EXCENTRIC MOTION TRANSLATING APPARATUS

[76] Inventor: Gustav Rennerfelt, Nilstorpsvägen 53, Lidingö S-181 47, Sweden

[21] Appl. No.: 392,539
[22] PCT Filed: Jan. 26, 1988
[86] PCT No.: PCT/SE88/00028
  § 371 Date: Jul. 21, 1989
  § 102(e) Date: Jul. 21, 1989
[87] PCT Pub. No.: WO88/05509
  PCT Pub. Date: Jul. 28, 1988

[30] Foreign Application Priority Data
Jan. 26, 1987 [SE] Sweden .............. 8700291
Nov. 16, 1987 [SE] Sweden .............. 8704493

[51] Int. Cl.$^5$ ............................. F16H 1/28
[52] U.S. Cl. ...................... 475/162; 475/178
[58] Field of Search ........ 475/162, 163, 178; 74/411

[56] References Cited

U.S. PATENT DOCUMENTS

| | | | |
|---|---|---|---|
| 3,037,400 | 6/1962 | Sundt | 74/804 |
| 3,546,972 | 12/1970 | Morozumi | 74/804 |
| 3,913,408 | 10/1975 | Moore | 475/162 X |
| 4,228,698 | 10/1980 | Winiasz | 475/178 |
| 4,429,595 | 2/1984 | Butterfield | 475/178 X |
| 4,512,213 | 4/1985 | Newton | 475/162 X |

FOREIGN PATENT DOCUMENTS

| | | |
|---|---|---|
| 204384 | 3/1966 | Sweden . |
| 342875 | 2/1972 | Sweden . |
| 8700291-1 | 1/1987 | Sweden . |

Primary Examiner—Leslie A. Braun
Assistant Examiner—Khoi Q. Ta
Attorney, Agent, or Firm—Witherspoon & Hargest

[57] ABSTRACT

A translation element, a so-called driving dog or transmitter, for translating the rotation of the center of gravity of an excentrically mounted excentric gear wheel (9) to a first shaft (14) when said wheel simultaneously executes a planetary movement about a second shaft. A rigid body (10,25) which is pivotably mounted about first pins (11, 12) has axially directed, tooth-like projections (26, 27) fitting with negligible play into two radially counter-directed apertures (22, 23) in said wheel (9) for permittinhg said projections to execute a radial reciprocally gliding motion in the apertures, simultaneously as they execute a rolling motion in said apertures, while the rigid body pivots about the first pins. A sleeve (245) is used to translate the rotation of a first shaft to a second shaft, said shafts not needing to be coaxial, parallel or needing to have a constant mutual, axial spacing, said sleeve co-acting with pins and projections which are in force-transmitting communication with each other and are arranged on the sleeve and on either of the shafts.

8 Claims, 11 Drawing Sheets

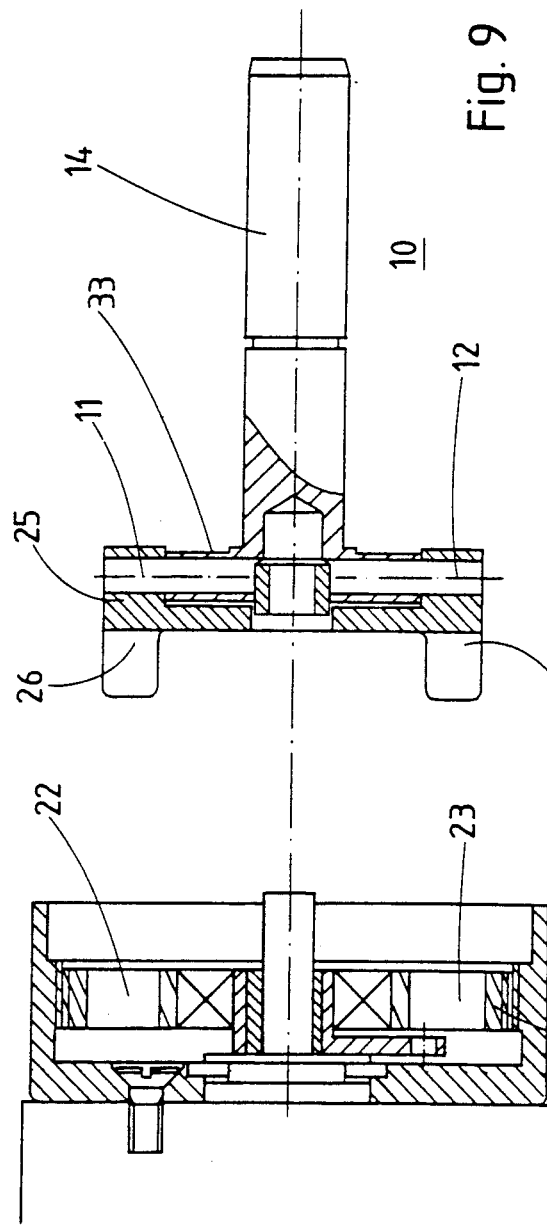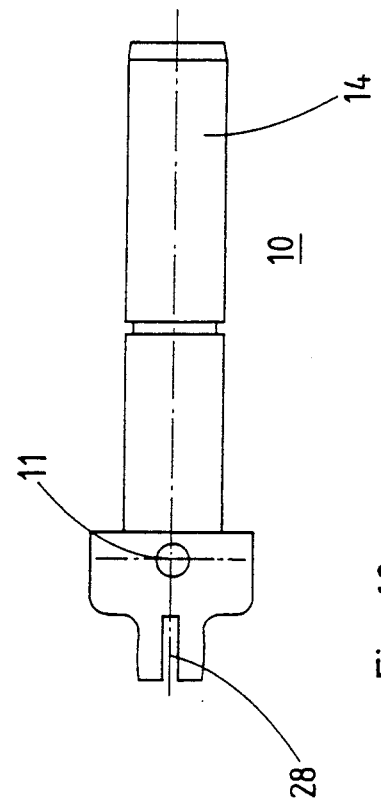

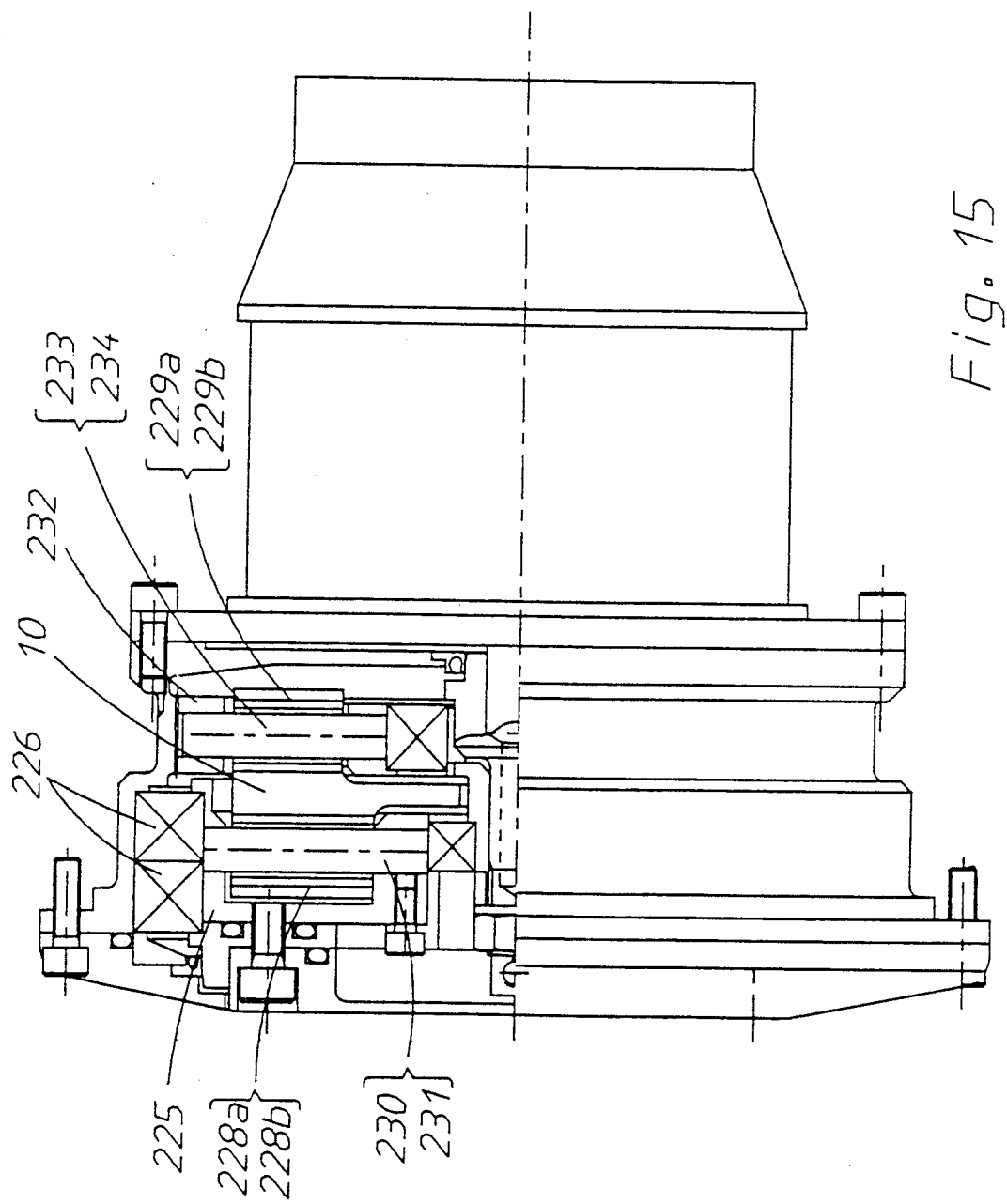

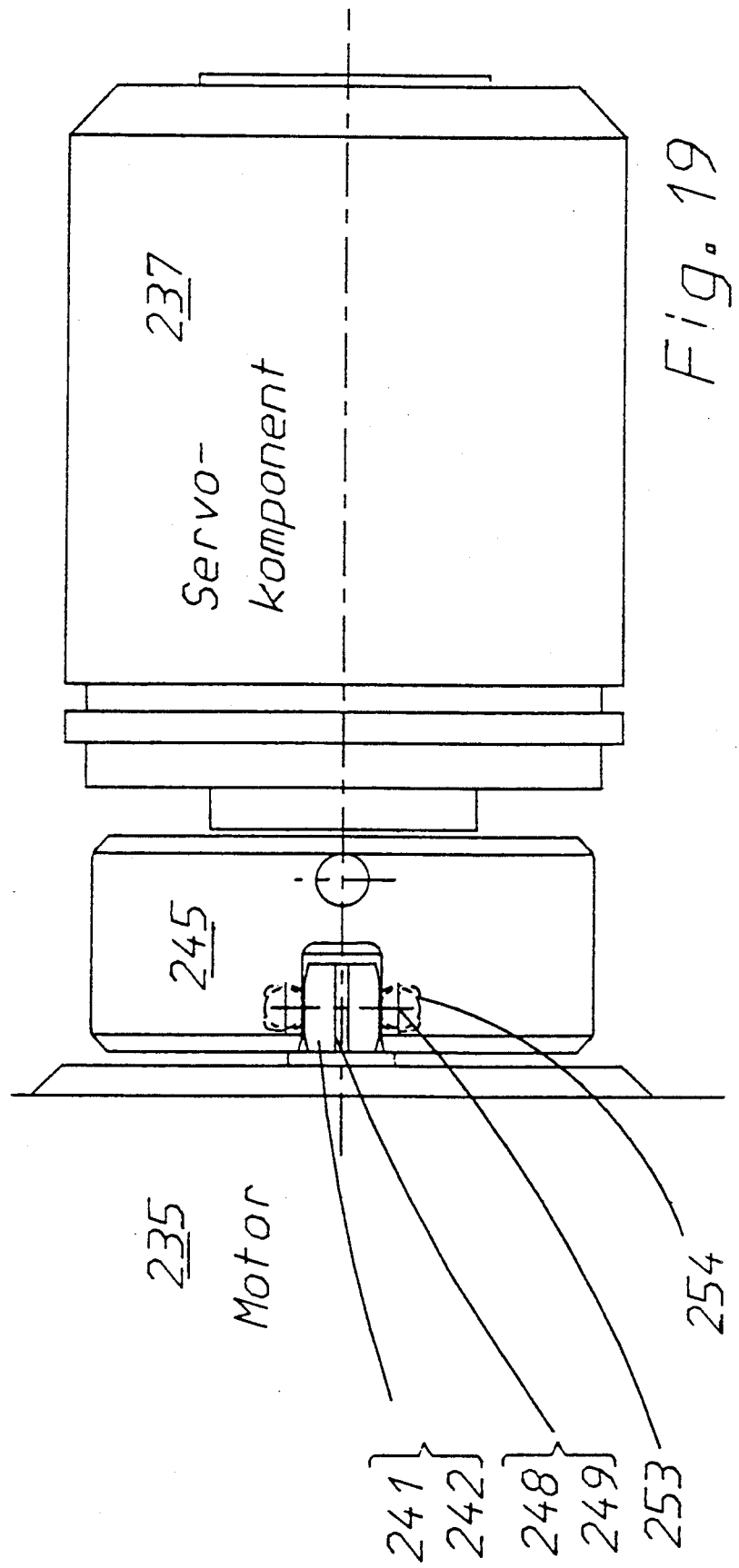

EXCENTRIC MOTION TRANSLATING APPARATUS

The present invention relates to a new movement translation element, a so-called transmitter or driving dog, the primary task of which is to translate the rotation of the excentrically mounted excentric gear wheel in an excentric gear to the output shaft thereof. Another application is as a coupling between shafts, particularly within the art of servo systems, and where the coupling does not transmit a bending movement.

A gear of the kind mentioned has an excentric gear wheel, also known as a satellite wheel or planet wheel, which is freely mounted on an excentric stub shaft which rotates together with the input shaft of the gear. The excentric gear wheel is in mesh with an outer, stationary, fixed gear wheel and rolls over the internal teeth thereof. The circumference of the excentric gear wheel is somewhat less than that of the fixed gear wheel. As it runs over the internal teeth of the fixed gear wheel, the excentric wheel executes slow rotation about its mounting on the excentric shaft simultaneously as its centre of gravity rotates at a high rotational rate about the input shaft. The Harmonic Drive ® gear is not counted as an excentric gear. Neither are planet gears or differential gears where the translation of rotation takes place with gear wheels to the output shaft. With regard to the properties of these gear types I refer to the description in my international patent application with the title "Excentric Gear" with the number 87 00291-1.

It is known to use a lever system or two slides, which are mutually displaced 90° (see Swedish patent 342 875) to translate the slow rotation of the excentric wheel to the output shaft.

These known transmission mechanisms are complicated and voluminous. They also have large backlash when the direction of rotation of the input shaft is reversed. Transmission means of this kind are used in such as ships, where such backlash can be tolerated and where there are no restrictions on space. In connection with ships, it is thus known to utilize pins as translation means, where the pins engage in holes in the excentric gear wheel. Two excentric wheels are used with the excentricity displaced by 180°, so that the gear will not have backlash due to the necessary diameter difference between the pins or rollers and the holes.

This well-known and often used principle has several serious disadvantages:

(a) Each roller is activated as force transmitter under a given angle of each completed revolution of the input shaft. The radial distance to the centre of the excentric wheel from the force transmitting roller varies as this angle is passed through. (The excentricity direction sweeps with the rotational rate of the input shaft past each roller). This radial variation in distance causes a sinus-shaped pulsation to be superposed on the rotational rate of the output shaft. In other words, the gear does not transmit a true angle. This pulsation can be reduced, but not eliminated, by using a large number of pins and rollers.

(b) Very tight tolerances on the ingoing components are required to get the gear to be free from backlash.

(c) Each roller must momentarily transmit the major part of the output shaft torque. A large reaction force then loads the output shaft bearing.

(d) The structure is complicated. The principle is difficult to use for small servo gears.

(e) The gear is noisy.

Another principle for translating the rotation of the excentric gear wheel to the output shaft is to use two universal joints. The disadvantage is that the structure is voluminous axially. Using one universal joint allowing axial movements in each direction is theoretically conceivable.

It is also known to utilize an elastic ruber connection between driving dog pins, which are arranged on the output shaft, and holes which are situated in the excentric wheel.

The present invention relates to a translation element of the kind described in the introduction, which does not have the disadvantages of the previously mentioned structures with regard to complexity, large volume, play, high noise level and untrue angle translation.

The driving dog proposed in accordance with the invention has a short axial length.

The driving dog in accordance with the invention allows the output shaft to form an angle relative to the input shaft, and also to execute a certain restricted axial movement. By mounting the output shaft in an angularly adjustable bearing, e.g. a ball bearing or spherical plane bearing, the gear can be one of the two bearings by which a shaft is journalled at its both ends, whereby the bearings adjust themselves without stresses, i.e. no bending forces are taken up in the bearings.

Figure 3:
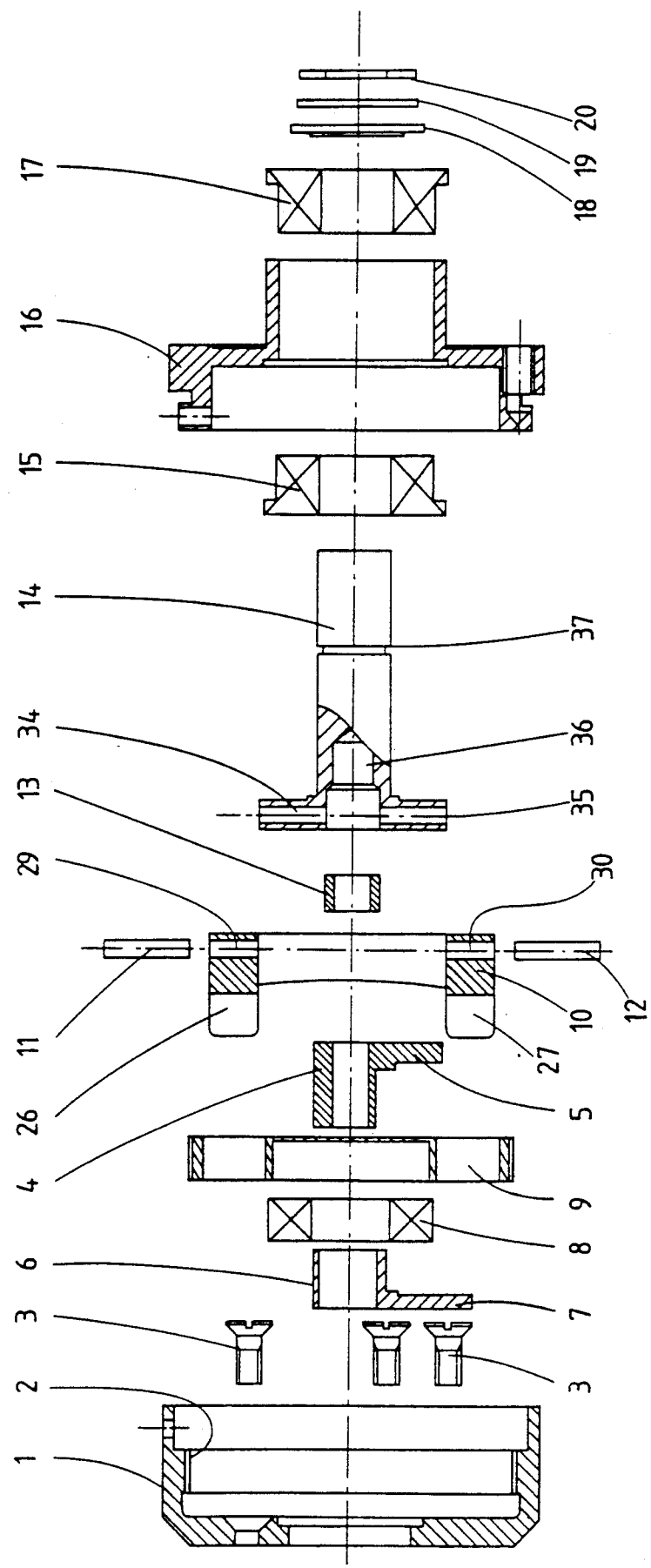
Figure 4:
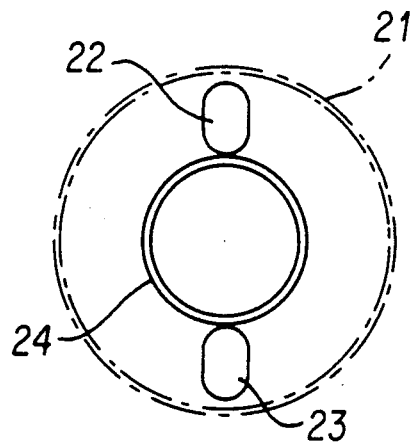
Figure 5:
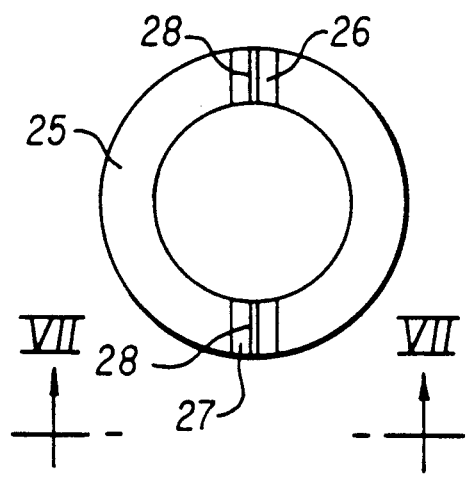
Figure 6:
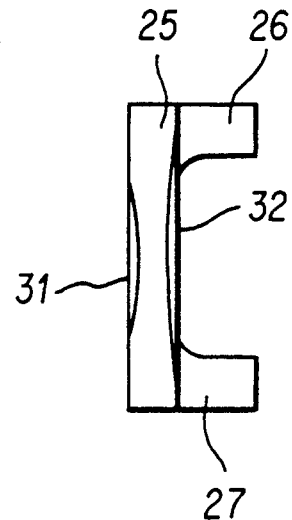
Figure 7:
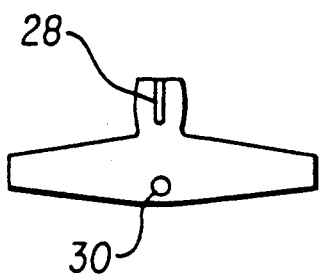
Figure 8:
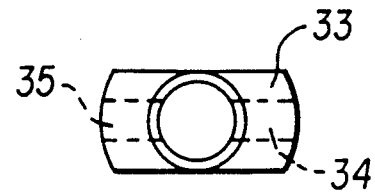
Figure 11:
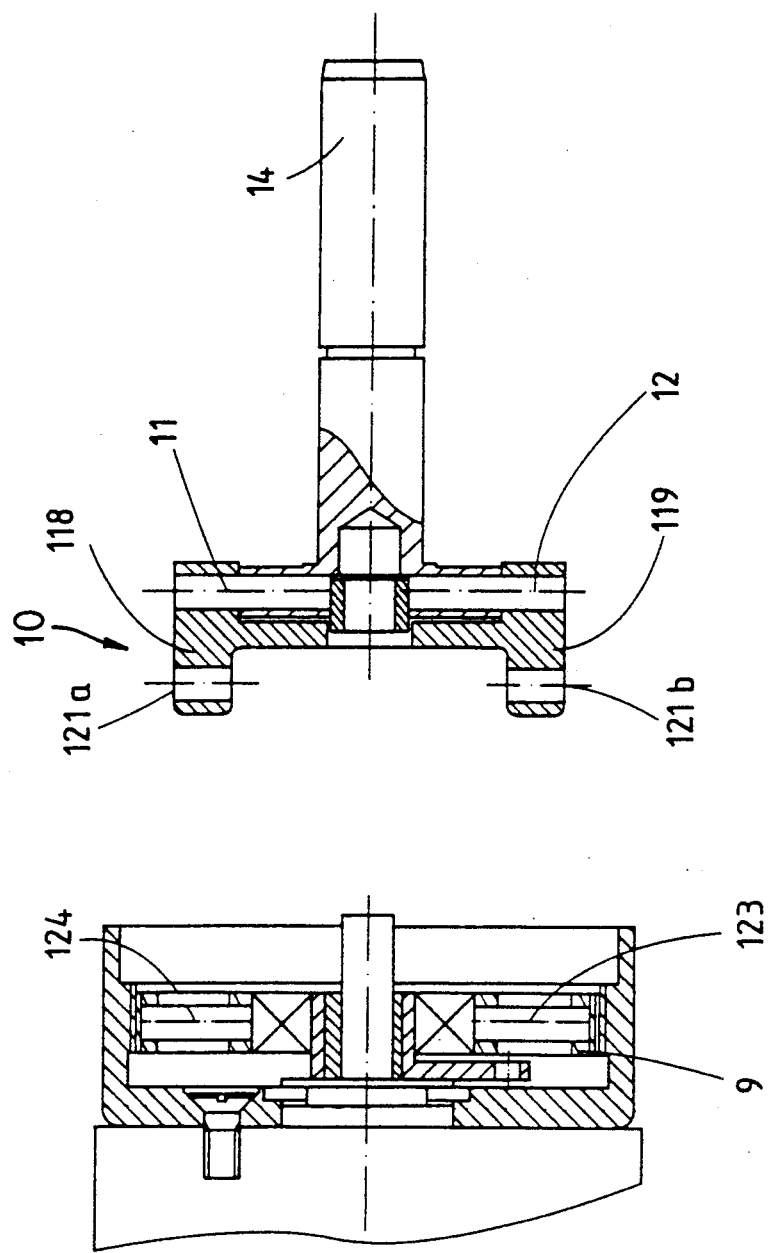
Figure 14:
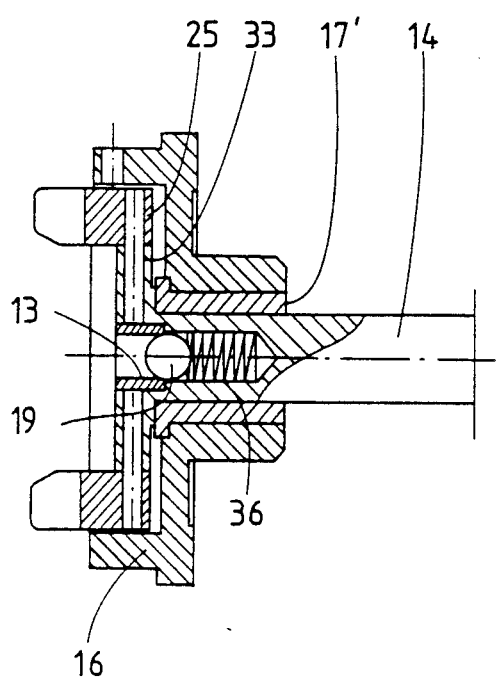
Figure 12:
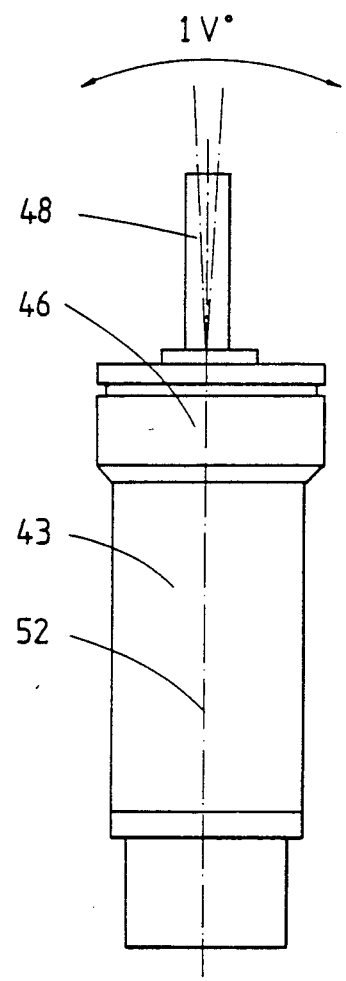
Figure 13:
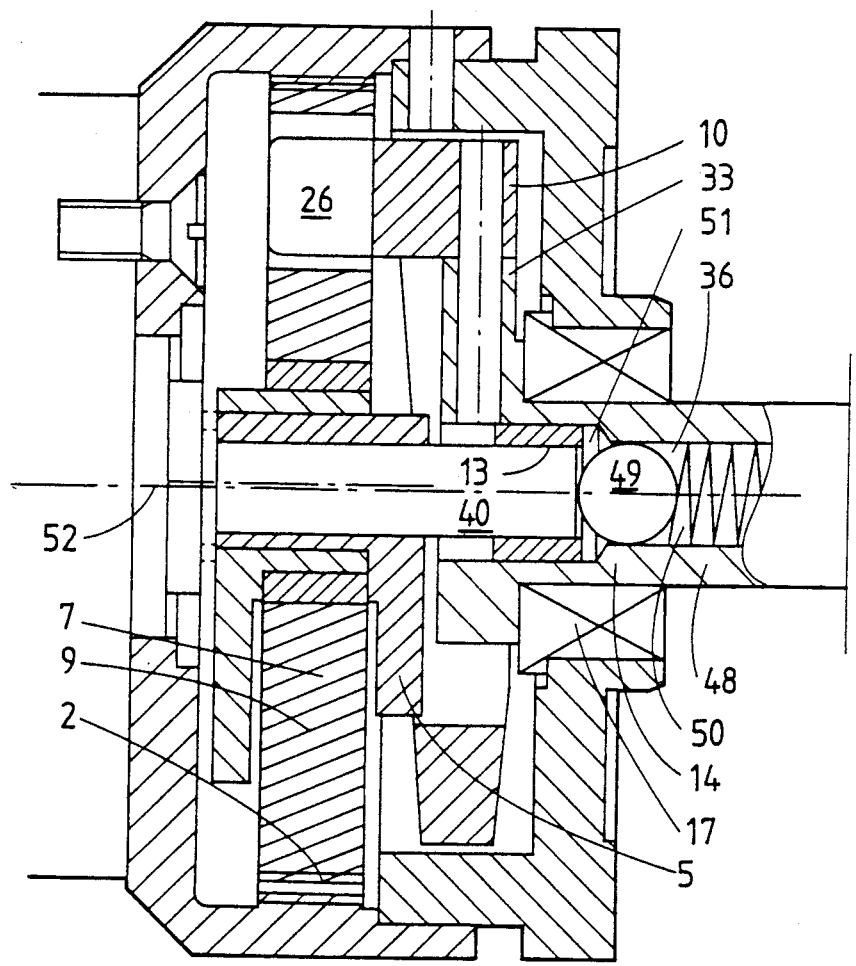
Figure 16:
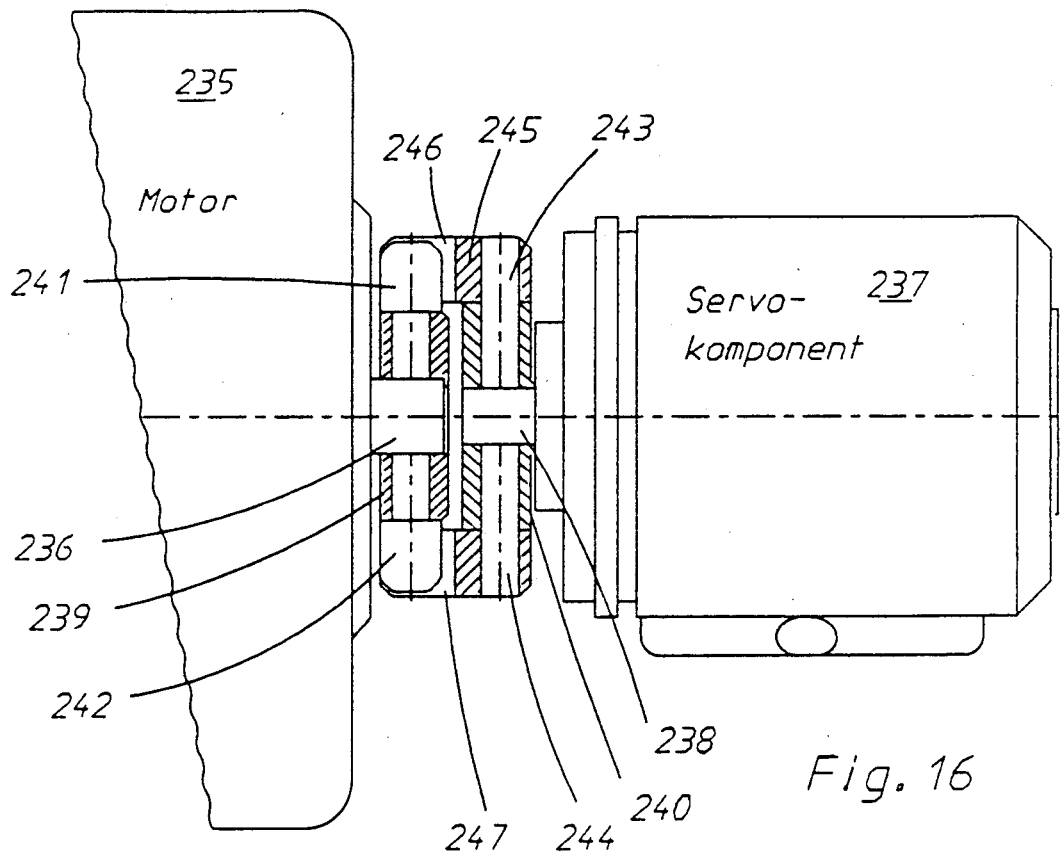
Figure 17:
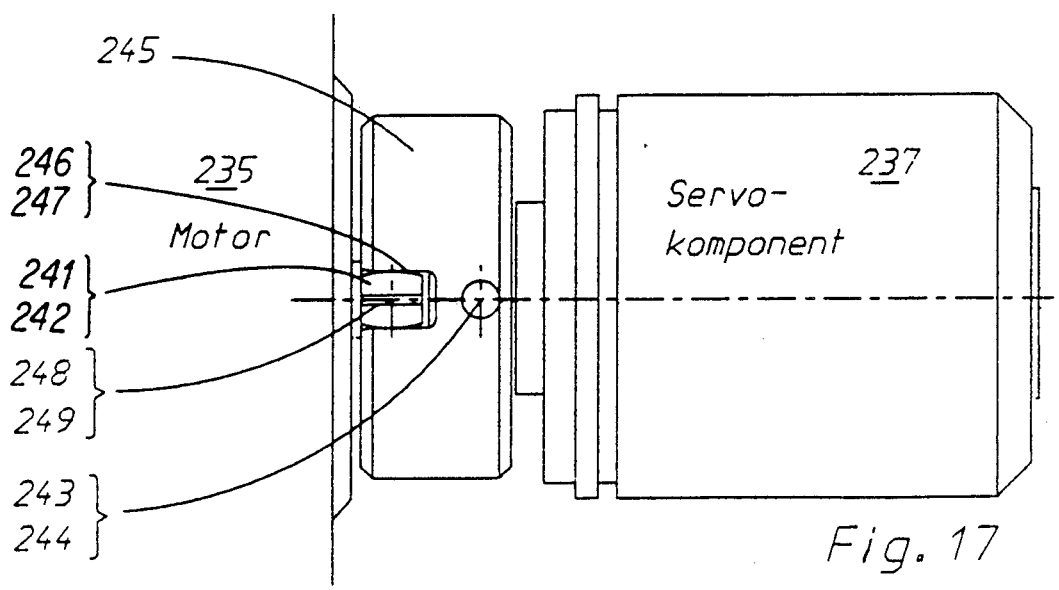
Figure 18:
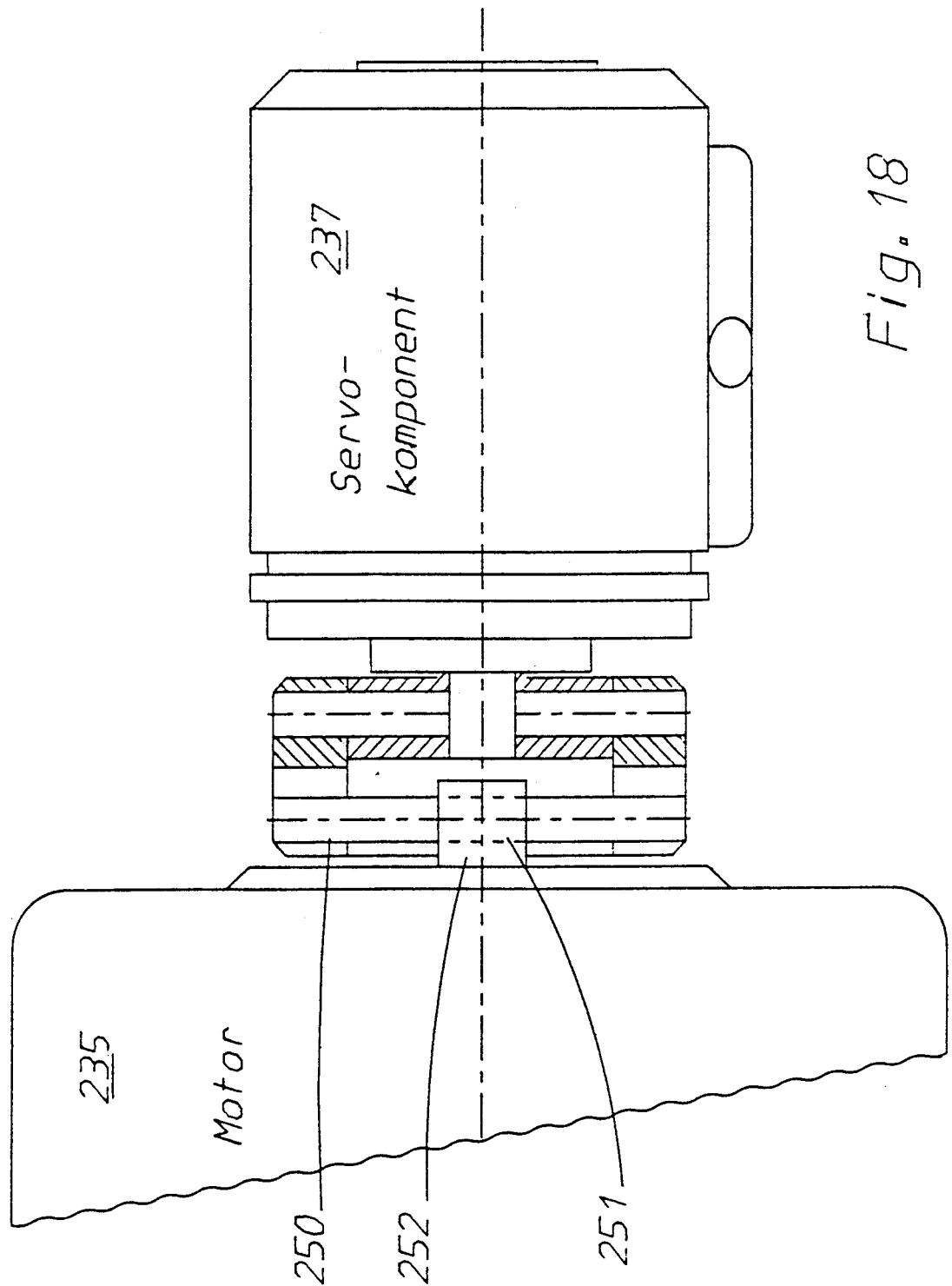

Different embodiments of the invention will now be described in more detail in connection with the accompanying drawings, where FIG. 1 is a front view of a known movement translating means, FIG. 2 is a longitudinal cross section of the means in FIG. 1, FIG. 3 is an exploded view of a first embodiment of a driving dog in accordance with the present invention, the driving dog being included in a excentric gear, FIG. 4 is view of the excentric gear wheel, FIG. 5 is a front view of a driving dog, FIG. 6 is a side view of the driving dog illustrated in FIG. 5, FIG. 7 is view along the line VII—VII in FIG. 5, FIG. 8 is a front view of the output shaft, FIG. 9 is a longitudinal section, in the left hand part of the figure, of the input part of the gear in an assembled state, and in the right hand part of the figure of the driving dog and shaft, FIG. 10 is a plan from above of the driving dog in FIG. 9, FIG. 11 is a section similar to the one in FIG. 9, but of a second embodiment of a driving dog in accordance with the present invention, FIG. 12 depicts the gear according to FIG. 1, in full size and mounted on a motor, FIG. 13 illustrates an alternative mounting of the output shaft of the driving dog, FIG. 14 illustrates a further alternative mounting of the driving dog output shaft, FIG. 15 is a partial longitudinal section of an alternative embodiment of the driving dog, FIG. 16 depicts another application of a driving dog in accordance with the invention, with the driving dog itself being in longitudinal section, FIG. 17 is a plan from above of the driving dog in FIG. 16, FIG. 18 is a depiction, similar to the one in FIG. 16, of a simplified embodiment of the driving dog in FIGS. 16 and 17, FIG. 19 is a side view of an alternative embodiment of the driving dog according to FIGS. 16 and 17.

The functional principle of a known translation element is illustrated in FIG. 1. A disc 102 is fastened to an output shaft 101. The disc 102 has a plurality of axially directed pins 103 on which rollers 104 are journalled. These rollers 104 roll over the surface of round holes 105 in an excentric wheel 106. The excentric wheel 106 has an excentricity e between the input and output shafts. The holes 105 have a diameter exceeding that of the rollers 104 by double the excentricity, i.e. 2e. When the excentric wheel rolls over the internally toothed stationary gear wheel 106b, and thereby executes its planetory movement with the rotational rate of the input shaft 106a, the rollers 104 journalled on the pins 103 will each in turn drive the output shaft 101. This translation device has the disadvantages described under (a)–(e) in the introductory part of the description.

A first embodiment of the driving dog: in accordance with the invention will now be described in connection with the application illustrated in FIGS. 3–10, where the driving dog is incorporated in an excentric gear, which includes a cylindrical housing 1 with a stationary gear wheel 2, integral with the housing 1. The stationary gear wheel 2 has internally cut teeth. A plurality of screws 3 are intended for fastening the gear to the end wall of a motor. The excentric gear further includes a first excentric means 6 with a counterweight 7, a first ball bearing 8, an excentric gear wheel 9, a driving dog 10, two pivot pins 11, 12, a bush 13, an output shaft 14, a second ball bearing 15, a bearing housing 16, a third ball bearing 17, a washer 18, a shims washer 19 and a circlip 20.

FIG. 4 is a front view of the excentric wheel, with its teeth denoted by 21. This wheel furthermore has two diametrically opposing openings or "tooth gaps" 22, 23 in its side surface facing towards the driving dog. The wheel also has an outstanding annular ring on the same side surface for receiving the first ball bearing 8.

It will be seen from FIGS. 5–7 that the driving dog includes an annular ring 25, provided on one side with two lugs or teeth 26, 27, which are situated diametrically opposite each other and are intended to glide reciprocatingly in the elongate openings 22, 23 in the excentric gear wheel. To ensure freedom from play in this reciprocal gliding movement, each lug is provided with a slit 28, which is most clearly shown in FIG. 7. These lugs keep the driving dog a right fit in the opening 22, 23. There are two radial through bores 29, 30 (FIG. 3) in the annular ring 25, these bores being situated diametrically opposite each other, and with the same angular position as the lugs 26, 27 on the annular ring 25. The bores 29, 30 are intended to receive the pivot pins 11 and 12. The driving dog 10 has bevelled surfaces 31 and 32 on either side of the annular ring.

At one end surface the output shaft 14 has a flange 33, the radial extension of which is not greater than that the flange 33 is accommodated inside the annular ring 25 of the driving dog. The flange 33 has two diametrically opposed bores 34, 35, in which the pivot pins 11 and 12 are urged with a press fit. The driving dog is thus pivotably mounted on the pivot pins 11, 12. As will be seen from FIGS. 3 and 8 the output shaft has a central bore 36 at the same end as the flange 33. This bore 36 is intended to accommodate the bush 13. An annular groove 37 for the circlip 20 is disposed on the output shaft a distance from the flange 33. The driving dog is assembled in the following way: The pivot pins 11, 12 are first thrust into the bores 29, 30 and further into the bores 34, 35 of the output shaft. The driving dog thus formed appears in the way illustrated in FIGS. 9 and 10.

In spite of the excentric gear wheel having a low rotational rate, its centre of gravity rotates with the high rotational rate of the input shaft. In accordance with the present invention, the driving dog 10 translates the slow rotation of the excentric gear wheel to the output shaft, and encroaches on the axial length of the gear substantially only by the thickness of the annular ring 25. The lugs 26, 27 of the driving dog are slit, or optionally made with a tooth configuration, such as to fit into the elongate openings 22, 23 of the excentric gear wheel. In its turn, the driving dog is mounted on the pivot pins 11, 12, which are fixed in the output shaft flange 33. By this configuration, the driving dog will execute a pivoting motion about the pivot pins. The centre of gravity of the driving dog will remain substantially stationary. The lugs 26, 27 of the driving dog will have a motion in the opening 22, 23 partly like a tooth in a tooth gap and partly reciprocating radially relative the excentric wheel. The angle of the pivoting movement caused by this "roll" of the lugs is about ±3° i.e. rather small. The lugs 26, 27 have a large working radius, and their ability to take up load can be compared with a gear wheel of a corresponding size and with corresponding module. A condition for the desired operation of the driving dog is that the lugs 26, 27 have the greatest possible torsional stiffness between them. The annular ring 25 should therefore be torsionally stiff. The bevelled parts 31 and 32 on the ring ensure that it does not engage against the excentric gear wheel or the baring housing 16 during the pivoting or rolling motion. The removal of metal to form the surfaces 31, 32 also reduces the moment of inertia of the driving dog about the pivot pins.

A variant of the driving dog is illustrated in FIG. 11. The previous tooth-like lugs 26, 27 have been formed here as short stiff projections 118, 119 on the driving dog 10. These projections 118, 119 have holes 121a, 121b bored parallel relative the holes for the pins 11, 12. The pins 123, 124 urged into the excentric gear wheel 9 using a press fit and are disposed for mounting the driving dog 10. This mounting permits both a certain rotational movement of about ±2.6° and a linear movement along the pins 123, 124 of ±0.3 mm which corresponds to the excentric motion of the gear wheel 9 for the gear size described in the Figure.

When the driving dog 10 is momentarily deflected out about the pins 11, 12, the excentric gear wheel 9 will move axially corresponding to the cord height which, with the values given above, will be about 0.005 mm. Since the wheel 9 is glidably mounted, this axial movement is no problem. When the excentric wheel 9 is mounted in ball bearings, the ball bearings should allow this movement. A standard ball bearing normally has an axial play which is at least two or three times greater.

A still further variant of the driving dog is illustrated in FIG. 15. The previous variants have had a sliding bearing between the driving dog and the excentric gear wheel and output shaft. For larger gears, where the greatest possible efficiency is desired, this gliding bearing may be replaced by a ball bearing. In FIG. 15 the output shaft has a plate 225 which is mounted in prestressed ball bearings 226. The driving dog 10 is mounted on this plate 225 with the aid of ball bushes 228a, 228b on the pins 230, 231 which permits the driving dog 10 to pivot a small angle, but does not allow any translatory movement. The excentric gear wheel 232 has two pressed-in pins 233, 234 wich are parallel to said pins. The ball bushes 229a, 229b pressed into the driving dog 10 are journalled on the pins 233, 234 and allow the driving dog 10 to pivot a small angle as well as allowing the excentric gear wheel 232 to move translatorily in the direction of said pins 233, 234.

In all variants described in FIGS. 3–10 and 11–15, the driving dog is subjected to torque on loading (braking) the output shaft. The driving dog must thus be dimensioned so that a sufficiently high torsional stiffness is obtained about the lugs or pins on the output shaft.

Another application of the driving dog is illustrated in FIG. 16. The connection of two shafts, and thereby the translation of a rotational movement requires some type of coupling. The task of the coupling is to translate the movement without play and without introducing bending forces between the shafts. This is a usual problem in the art of servo systems. For example, an angle transducer is to be connected to a shaft, the angular position of which it is to measure. A load in the form of a bending moment on the angle transducer shaft can easily affect its measuring accuracy.

Bellows or diaphragm couplings are often used here. These couplings have limited torsional stiffness, as well as great axial and/or diametrical dimensions.

The ideal coupling should have the following properties:

(a) It is insensitive to static and dynamic translatory positional errors between the shafts in all three coordinate directions.

(b) It is insensitive to static and dynamic angular errors between the shafts in the coordinate directions at right angles to the axial direction of the rotation which is to be translated.

(c) It provides true angular translation.

(d) It is torsionally stiff.

(e) It comprises two parts. The parts should be able to be assembled one each shaft end individually. This facilates assembly and simplifies service exchanges, e.g. of the abovementioned angle transducer.

(f) It should have small volume In particular, its axial length should be small, (g) It should have low cost.

FIG. 16 illustrates an example of the translation of the angular position from the shaft end 236 of a motor 235 to the shaft end 238 of an angle transducer 237. Two cylindrical hubs 239, 240 are attached to the respective shaft ends 236 238. These hubs each have two radially directed pins 241, 242, and two journalling pins 243, 244. A sleeve 245 is mounted without play on the pins 243, 244. This sleeve 245 has two radial slots 246, 247 which have a tight fit to the pins 241, 242 which as depicted in FIG. 17 will eliminate play.

FIG. 17 illustrates the units of FIG. 16 seen from above. The sleeve 245 is suitably manufactured in plastics. By utilising the elasticity of the plastics, a local pre-stress round the pins 241, 242 is obtained, and which eliminates wear. Alternatively, the pins 241, 242 may have slits 248, 249. Dismantling and exchange of the angle transducer is facilitated without needing to disturb either half of the coupling. Of course, the cylindrical hubs 239, 240 may be made in plastics, and optionally integrally with the pins 241, 242.

FIG. 18 illustrate a simplification of the coupling according to FIGS. 16, 17. The hub 239 and its two pins 241, 242 has been replaced with a cylindrical pin 250 which is pressfitted, screwed, glued or otherwise fixed within a transverse hole 251 extending through a shaft 252.

FIG. 19 illustrates a modification of the embodiment shown in FIGS. 16, 17. To reduce the radial load on the journals, and to reduce the wear occurring due to friction between the slots of the sleeve 245 and the pins 241, 242, the torque is transferred by balls 253 rolling in recesses or grooves 254 in the sleeve 245. Of course, the balls can be alternatively placed in corresponding grooves in the pins 241, 242.

The embodiments described above can be modified in many ways and varied within the scope of the inventive concept.

This novel type of translation element, the driving dog, has several advantages over previously known and above-mentioned types, namely:

(a) True angle translation. No superposed pulsation is obtained on the output shaft.

(b) Torque is taken from the excentric gear wheel at a large radius, with the reaction forces of the load torque being distributed equally on diametrically opposed sides of the centre of the output shaft, resulting in that the forces balance each other and do not load the mounting of the output shaft. (The frictional force between the driving dog and the excentric gear wheel loads this mounting however).

(c) The gear is given a very short structural length.

(d) A low price. No tight tolerances. The holes in the driving dog and excentric gear wheel for the pins are broached with conventional tools. No part matching work is required during assembly.

I claim:

1. Motion transmitting element, a so-called driving dog or transmitter, for translating the rotation of the center of gravity of an excentrically mounted excentric gear wheel (9) to a first shaft (14) while the excentric gear wheel simultaneously executes a planetary movement about a second shaft, characterized by a rigid body (10, 25) mounted for pivoting about first pivot pins (11, 12) which are disposed substantially at right angles to said first shaft (14) said rigid body having in its symmetry plane for the first pins and first shaft axially directed, tooth-like projections (26, 27; 118, 119) which fit with negligible play into two radially counter-directed apertures (22, 23) in the excentric gear wheel (9) for allowing said projections to execute radial sliding reciprocatory motion in the apertures simultaneously as they execute a rolling movement therein, and the rigid body pivots round the first pins.

2. Motion transmitting element as claimed in claim 1, characterized in that the tooth-like projections are replaced with projections having through openings (121a, 121b) in which two second pins (123, 124) arranged radially counter-directed in the excentric gear wheel (9) are mounted for allowing the projections to carry out a radial, sliding reciprocatory motion along the second pins simultaneously as they pivot about them and simultaneously as the rigid body pivots about the first pins.

3. Motion transmitting element as claimed in claim 2, characterized in that the first and second pins are mounted in spherical bushings.

4. Motion transmitting element for translating the rotation of a first shaft to a second shaft, said shafts not needing to be co-axial, parallel or needing to have constant mutual, axial spacing, characterized by a sleeve (245), one end of which is pivotably mounted in first pins (243, 244) which are radially counter-directed and arranged on one of said shafts, and in the other end of said sleeve there being arranged slots diametrically opposite each other in line with the first pins, there also being second pins arranged radially opposing on the other of said shafts and intended for being in forcetransmitting engagement with the slot.

5. Motion transmitting element as claimed in claim 1, characterized by slits (28) being made in the projections for prestressing the projections in the apertures.

6. Motion transmitting element as claimed in claim 4, characterized in that slits (248, 249) are made in the second pins (241, 242) for counter-acting wear between sleeve (245) and said pins.

7. Motion transmitting element as claimed in claim 4, characterized in that grooves (254) are made in the sleeve (245) or in the pins (241, 242) for balls (253), the task of which is to transmit the torque and simultaneously reduce the friction, and thereby the radial and axial forces on the mountings of the shafts.

8. Motion transmitting element as claimed in claim 6, characterized in that grooves (254) are made in the sleeve (245) or in the pins (241,242) for balls )253), the task of which is to transmit the torque and simultaneously reduce the friction, and thereby the radial and axial forces on the mountings of the shafts.

* * * * *